United States Patent
Huang-Fu et al.

(10) Patent No.: US 11,153,925 B2
(45) Date of Patent: *Oct. 19, 2021

(54) HANDLING OF QOS FLOW DESCRIPTION WITHOUT VALID EPS BEARER CONTEXT

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Shang-Ru Mo, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 20 days.

This patent is subject to a terminal disclaimer.

(21) Appl. No.: 16/738,750

(22) Filed: Jan. 9, 2020

(65) Prior Publication Data
US 2020/0228443 A1    Jul. 16, 2020

Related U.S. Application Data

(60) Provisional application No. 62/791,956, filed on Jan. 14, 2019.

(51) Int. Cl.
*H04W 76/20* (2018.01)
*H04L 12/725* (2013.01)
(Continued)

(52) U.S. Cl.
CPC .......... *H04W 76/20* (2018.02); *H04L 45/302* (2013.01); *H04L 45/38* (2013.01); *H04L 49/555* (2013.01); *H04L 49/557* (2013.01); *H04W 40/24* (2013.01)

(58) Field of Classification Search
CPC ..... H04W 76/20; H04W 76/11; H04W 76/12; H04W 76/22; H04W 28/0268;
(Continued)

(56) References Cited

U.S. PATENT DOCUMENTS

2014/0056130 A1* 2/2014 Grayson ............... H04W 76/12
370/230
2018/0192334 A1* 7/2018 Wu ................... H04W 36/0044
(Continued)

OTHER PUBLICATIONS

International Search Report and Written Opinion of International Search Authority for PCT/CN2020/01893 dated Mar. 26, 2020 (9 pages).

(Continued)

*Primary Examiner* — Min Jung
(74) *Attorney, Agent, or Firm* — Imperium Patent Works; Zheng Jin

(57) ABSTRACT

A method of handling QoS flow descriptions with invalid EPS bearer context is proposed. During an EPS bearer activation or modification procedure, a UE may receive an ePCO/PCO IE for creating a new QoS flow description or modifying an existing QoS flow description. if UE detects that the to be created/modified QoS flow descriptions are associated with invalid EPS bearer context, then UE does, not create/modify the QoS flow descriptions. Instead, UE locally deletes the QoS flow descriptions provided by the network. In addition, UE indicates a 5GSM cause to the network via PCO/ePCO. As a result, when inter-system change from EPS to 5GS happens, UE no longer needs to handle the QoS flow descriptions with invalid EPS bearer context.

18 Claims, 4 Drawing Sheets

(51) Int. Cl.
*H04L 12/721* (2013.01)
*H04L 12/939* (2013.01)
*H04W 40/24* (2009.01)

(58) Field of Classification Search
CPC . H04W 40/24; H04W 40/248; H04W 45/302;
H04W 45/38; H04W 49/555; H04W
49/557; H04L 45/302; H04L 45/38; H04L
49/555; H04L 49/557
See application file for complete search history.

(56) References Cited

U.S. PATENT DOCUMENTS

| | | | | |
|---|---|---|---|---|
| 2018/0234903 | A1* | 8/2018 | Jheng | H04W 36/0066 |
| 2020/0008106 | A1* | 1/2020 | Huang-Fu | H04L 41/00 |
| 2020/0077315 | A1* | 3/2020 | Jin | H04W 76/16 |
| 2020/0162968 | A1* | 5/2020 | Huang-Fu | H04W 76/20 |
| 2020/0267617 | A1* | 8/2020 | Larsen | H04W 36/30 |
| 2020/0267780 | A1* | 8/2020 | Huang-Fu | H04W 76/11 |
| 2020/0383151 | A1* | 12/2020 | Wang | H04W 36/00 |
| 2021/0084524 | A1* | 3/2021 | Foti | H04W 28/24 |

OTHER PUBLICATIONS

C1-190300 3GPP TSG CT WG1 Meeting #114, MidiaTek Inc., "Handling of QoS flow description without valid EPS bearer context", Bratislava, Slovakia, Jan. 21-25, 2019 (9 pages) *pages 1-9*.

C1-186246 3GPP TSG-CT WG1 Meeting #112bis, Qualcomm Incorp., Mapped QoS information validation (Solution 1), Vilnius, Lithuania, Oct. 15-19, 2018 (20 pages) *pages 1-20*.

* cited by examiner

HANDLING OF QOS FLOW DESCRIPTION WITHOUT VALID EPS BEARER CONTEXT

CROSS REFERENCE TO RELATED APPLICATIONS

This application claims priority under 35 U.S.C. § 119 from U.S. Provisional Application No. 62/791,956, entitled "Enhancement of 5G QoS Operations", filed on Jan. 14, 2019, the subject matter of which is incorporated herein by reference.

TECHNICAL FIELD

The disclosed embodiments relate generally to wireless communication, and, more particularly, to method of handling of Quality of Service (QoS) flow description without valid EPS bearer association in 5G system (5GS) and 4G LTE systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

In 5G, a Protocol Data Unit (PDU) session establishment is a parallel procedure of a Packet Data Network (PDN) connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like Evolved Packet System (EPS) bearer in 4G. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Each QoS flow may include multiple QoS rules consisting of QoS profile, packet filters, and precedence order.

When a QoS flow is added, the network can provide a QoS flow description IE to the UE, which comprises a list of QoS flow descriptions. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. When a QoS flow is deleted, all the associated EPS bearer context information that are mapped from the deleted QoS flow should be deleted from the UE and the network. This implies that in EPS, a QoS flow description should not exist if there is no corresponding valid EPS bearer context. Otherwise, after inter-system change (e.g., from EPS to 5GS), the handling of the QoS flow description associated with invalid EPS bearer is not defined.

The same principle applies to the EPS bearer activation and modification procedures when QoS flow description IE is provided. A solution is sought if QoS flow description IE is provided without valid EPS bearer association.

SUMMARY

A method of handling QoS flow descriptions with invalid EPS bearer context is proposed. During an EPS bearer activation or modification procedure, a UE may receive an ePCO/PCO IE for creating a new QoS flow description or modifying an existing QoS flow description. if UE detects that the to be created or modified QoS descriptions are associated with invalid EPS bearer context, then UE does not create or modify the QoS flow descriptions. Instead, UE locally deletes the QoS flow descriptions and all the associated QoS rules. In addition, UE indicates a 5GSM cause to the network via PCO/ePCO. As a result, when inter-system change from EPS to 5GS happens, UE no longer needs to handle the QoS flow descriptions with invalid EPS bearer context.

In one embodiment, a UE receives an extended Protocol Configuration Options (ePCO)/PCO information element (IE) for a Packet Data network (PDN) connection in a mobile communication network. The ePCO/PCO IE carries a list of Quality of Service (QoS) flow descriptions associated to the PDN connection. The UE determines that one QoS flow description comprises a QoS operation code for creating or modifying the QoS flow description of the PDN connection. The UE detects that no valid Evolved Packet System (EPS) bearer context is associated to the QoS flow description. The UE deletes the QoS flow description and sending a 5G session management (5GSM) a cause value indicating an error of the QoS operation.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
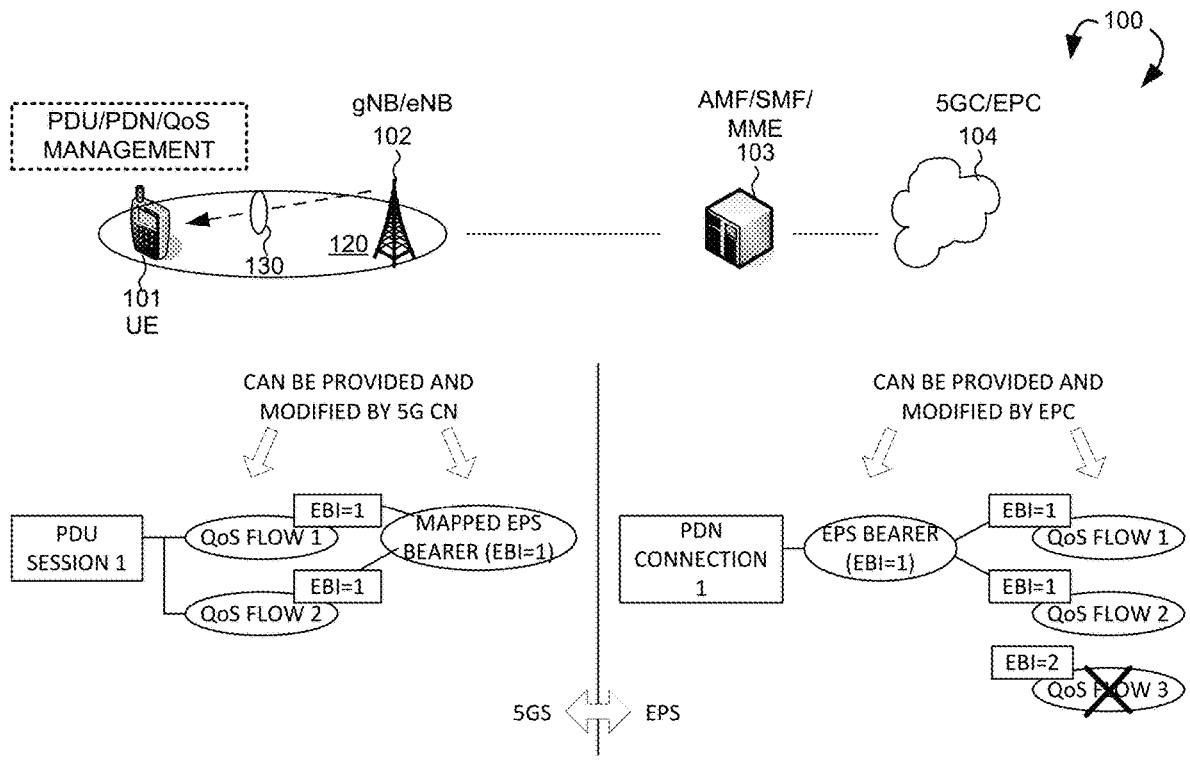
FIG. 1 illustrates an exemplary 5GS/EPS network supporting Protocol Data Unit (PDU) session/Packet Data Network (PDN) connection and Quality of Service (QoS) management with inter-system change in accordance with one novel aspect.

FIG. 1 illustrates an exemplary 5GS/EPS network 100 supporting Protocol Data Unit (PDU) session/Packet Data Network (PDN) connection and Quality of Service (QoS) management with inter-system change and handling of QoS flow description in accordance with one novel aspect. 5G new radio (NR) and 4G evolved packet system (EPS) network 100 comprises a user equipment UE 101, a base station gNB/eNB 102, an access and Mobility Management Function (AMF)/Session Management Function (SMF)/mobility management entity (MME) 103, and a 5G core (5GC)/4G evolved packet core (EPC) 104. In the example of FIG. 1, UE 101 and its serving base station gNB/eNB 102 belong to part of a radio access network RAN 120. In Access Stratum (AS) layer, RAN 120 provides radio access for UE 101 via a radio access technology (RAT). In Non-Access Stratum (NAS) layer, AMF/SMF/MME 103 communicates with gNB/eNB 102 and 5GC/EPC 104 for access and mobility management and PDU session/PDN connection management of wireless access devices in 5G network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5GS and EPS networks are packet-switched (PS) Internet Protocol (IP) networks. This means that the networks deliver all data traffic in IP packets, and provide users with Always-On IP Connectivity. When UE joins a 5GS/EPS network, a Packet Data Network (PDN) address (i.e., the one that can be used on the PDN) is assigned to the UE for its connection to the PDN. In 4G EPS has defined a Default EPS Bearer to provide the IP Connectivity that is Always-On. In 5G, a Protocol Data unit (PDU) session establishment procedure is a parallel procedure of a PDN connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like EPS bearer in 4G.

When a QoS flow is added, the network can provide a QoS flow description IE to the UE, which comprises a list of QoS flow descriptions. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. When a QoS flow is deleted, all the associated EPS bearer context information that are mapped from the deleted QoS flow should be deleted from the UE and the network. This implies that in EPS, a QoS flow description should not exist if there is no corresponding valid EPS bearer context. Otherwise, after inter-system change (e.g., from EPS to 5GS), the handling of the QoS flow description associated with invalid EPS bearer is not defined. This principle applies to the EPS bearer activation and modification procedures when QoS flow description IE is provided.

In the example of FIG. 1, in 5GS, UE 101 establishes a PDU session 1, which includes QoS flow1 and QoS flow2 in Non-Access Stratum (NAS) layer. QoS flow1 has a mapped EPS bearer with EBI=1, Qos flow2 also has a mapped EPS bearer with EBI=1. Upon inter-system change from 5GS to EPS, the PDU session 1 is converted to a PDN connection 1, and both QoS flow1 and QoS flow2 are mapped to the default EPS bearer with EBI=1. In EPS, UE 101 may receive additional "create new OoS flow description" operation code in the QoS flow description IE (e.g., via PCO/ePCO). In accordance with one novel aspect, it UE 101 detects that the to be created QoS flow1 descriptions are associated with invalid EPS bearer context, then UE 101 does not create the QoS flow descriptions. Instead, UE 101 locally deletes the QoS flow descriptions (and all QoS rules of the corresponding QoS flow) provided by the network. In addition, UE 101 indicates a 5GSM cause (e.g., 84 "syntactical error in the QoS operation") to the network via PCO/ePCO. As a result, when inter-system change from EPS to 5GS happens, UE 101 no longer needs to handle the QoS flow descriptions with invalid EPS bearer association.

Figure 2:
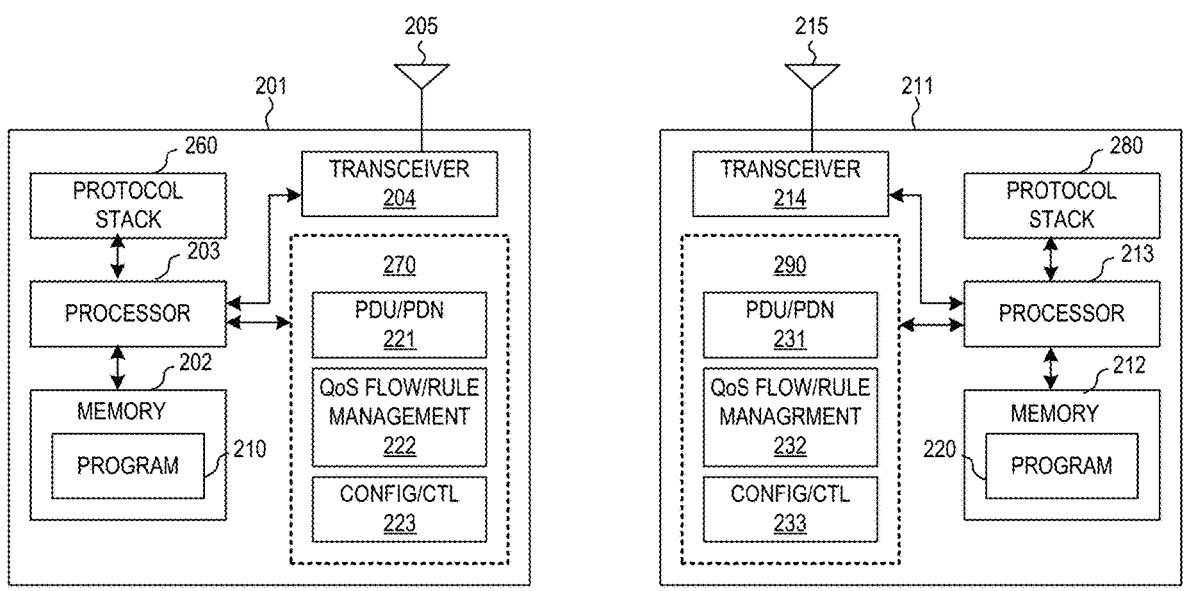
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session and PDN connection handling circuit 231 handles PDU/PDN establishment and modification procedures. QoS flow and QoS rule management circuit 232 creates, modifies, and deletes QoS flows and QoS rules for UE. Configuration and control circuit 233 provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session and PDN connection handling circuit 221 that performs PDU session and PDN connection establishment and modification procedures with the network, a QoS flow and rule management circuit 222 that manages, creates, modifies, and deletes QoS flows and QoS rules, a config and control circuit 223 that handles configuration and control parameters for mobility management and session management. In one example, if UE 201 detects that a QoS flow description is associated with invalid EPS bearer context, then UE 201 does not create or modify the QoS flow descriptions. Instead, UE 201 locally deletes the QoS flow description and all associated QoS rules provided by the network. In addition, UE 201 indicates a 5GSM cause (e.g., #84 "syntactical error in the QoS operation") to the network via PCO/ePCO.

Figure 3:
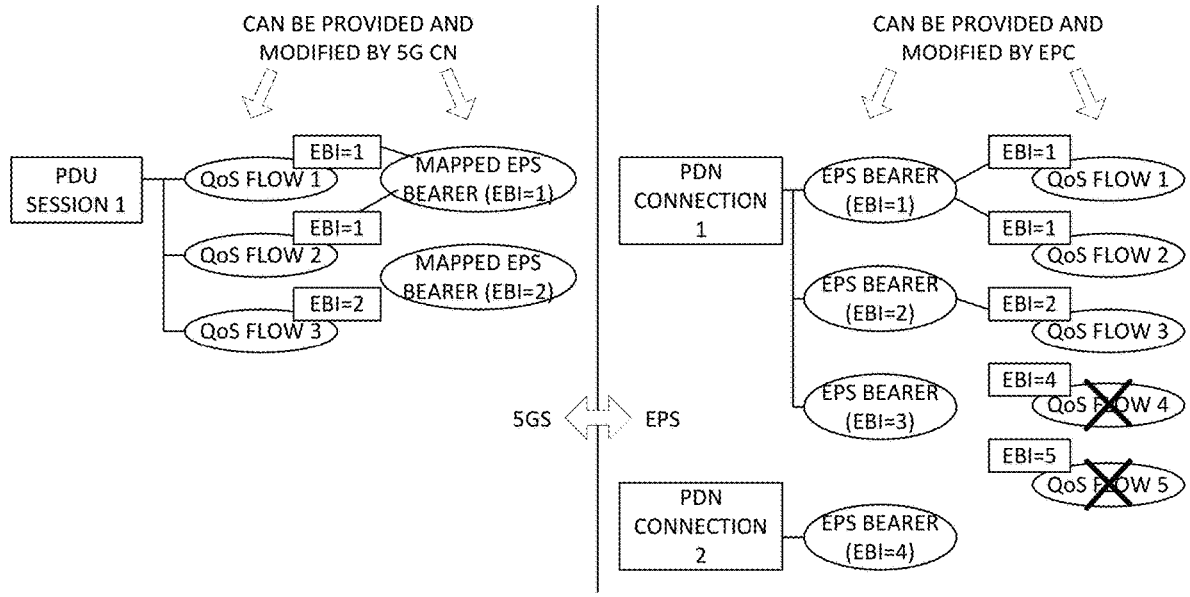
FIG. 3 illustrates one embodiment of inter-system change from EPS to 5GS supporting PDN connection to PDU session mapping and handling QoS flow descriptions associated with invalid EPS bearer context.

FIG. 3 illustrates one embodiment of inter-system change from EPS to 5GS supporting PDN connection to PDU session mapping and handling QoS flow descriptions associated with invalid EPS bearer context. A PDU session establishment in 5G is a parallel procedure of a PDN connection procedure in 4G. A PDU session defines the association between the UE and the data network that provides a PDU connectivity service. Each PDU session is identified by a PDU session ID, and may include multiple QoS flows and QoS rules in Non-Access Stratum (NAS) layer. Each QoS flow in NAS layer needs to be supported by a mapping Data Radio Bearer (DRB) in Access Stratum (AS) layer. In 4G EPS, each PDN connection includes a default EPS bearer and one or multiple dedicated EPS bearers, each EPS bearer is identified by an EPS bearer ID (EBI) to support associated QoS flow(s).

In the example of FIG. 3, for PDU session 1, QoS flow1 is associated to a mapped EPS bearer with EBI=1, QoS flow2 is also associated to the mapped EPS bearer with EBI=1, and QoS flow 3 is associated to a mapped EPS bearer with EBI=2. Upon inter-system change from 5GS to EPS, PDU session 1 is converted to a corresponding PDN connection 1. The PDN connection 1 has an established EPS bearer with EBI=1, which is associated to QoS flow1 and QoS flow2, and another established EPS bearer with EBI=2, which is associated to QoS flow3. In 4G EPS, the EPC, network may establish additional EPS bearer with EBI=3 for. PDN connection 1, and an EPS bearer with EBI=4 for PDN connection 2. In addition, the EPC network may attempt to create new QoS flow descriptions via EPS bearer activation and modification procedures. For example, the EPC network attempts to create QoS flow4 associated with EPS bearer having EBI=4 and QoS flow5 associated with EPS bearer having EBI=5. However, EPS bearer with EBI=4 belongs to a different PDN connection 2, and EPS bearer with EBI=5 is not an active EPS bearer. Accordingly, UE deletes the QoS flow descriptions for QoS flow4 and QoS flow5 provided by the network. In addition, UE indicates a 5GSM cause (e.g., #84 "syntactical error in the QoS operation") to the network via PCO/ePCO. This way, undefined behavior of the handling of the QoS flow description associated with invalid EPS bearer upon inter-system change (from EPS to 5GS) is prevented.

Figure 4:
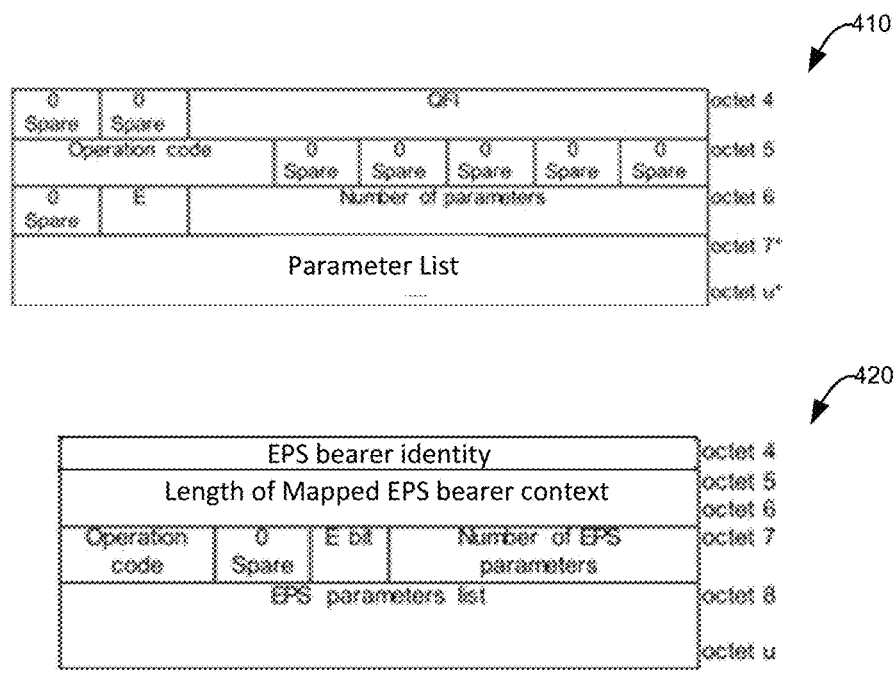
FIG. 4 illustrates one embodiment of a QoS flow description identified by a QoS flow identity (QFI) and one embodiment of a mapped EPS bearer context identified by an EPS bearer identity (EBI).

FIG. 4 illustrates one embodiment of a QoS flow description identified by a QoS flow identity (QFI) and one embodiment of a mapped EPS bearer context identified by an EPS bearer identity (EBI). For QoS flow configuration, the network can provide a QoS flow description IE to the UE, which comprises a list of QoS flow descriptions. Each QoS flow description, as depicted by 410 of FIG. 4, comprises a QFI, a QoS flow operation code, a number of QoS flow parameters, and a QoS flow parameter list. As defined by the 3GPP specification, a parameter identifier field is used to identify each parameter included in the parameter list and it contains the hexadecimal coding of the parameter identifier. For example, the following parameter identifiers are specified: 01H(5QI), 02H(GFBR uplink), 03H(GFBR downlink), 04H(MFBR uplink), 05H(MFBR downlink), 06H(averaging window), 07H(EPS bearer identity). It can be seen that one of the parameter identifiers is EBI, which is used to identify the EPS bearer that is mapped to or associated with the QoS flow. For mapped EPS bearer configuration, the network can provide a mapped EPS bearer context IE, which comprises a list of mapped EPS bearer contexts. Each mapped EPS bearer context, as depicted by 420 of FIG. 4, comprises an EBI, a length of mapped EPS bearer context, an EPS bearer operation code, a number of EPS bearer parameters, and an EPS bearer parameter list. Each mapped EPS bearer context is associated to a QoS flow through the EBI.

When creating a new QoS flow description, UE needs to make sure that the new QoS flow description has corresponding valid EPS bearer association. In one example, if a new QoS flow description with "create new QoS flow description" operation code is provided by the network to a UE, and the new QoS flow description has no associated valid EPS bearer context, then the UE will locally delete the QoS flow description. UE will indicate a 5GSM cause (e.g., #84 "syntactical error in the QoS operation") to the network via PCO/ePCO. This way, undefined behavior of the handling of the QoS flow description associated with invalid EPS bearer upon inter-system change (from EPS to 5GS) is prevented.

Figure 5:
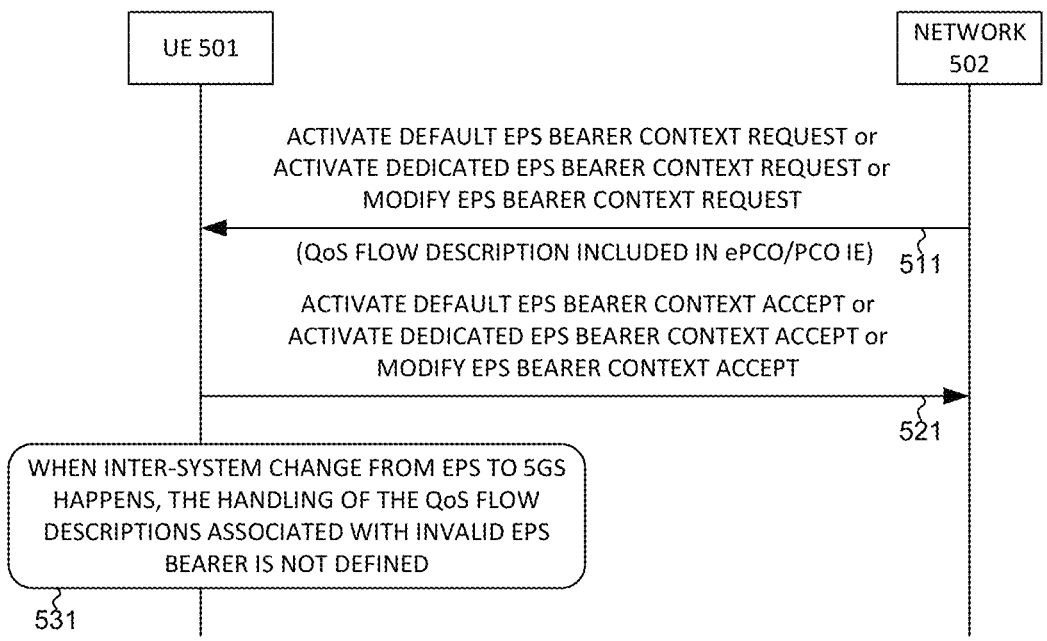
FIG. 5 illustrates a sequence flow between a UE and a network entity for EPS bearer activation and modification procedures when a QoS flow description IE is provided without valid EPS bearer association.

FIG. 5 illustrates a sequence flow between a UE and a network entity for EPS bearer activation and modification procedures when a QoS flow description IE is provided without valid EPS bearer association. In step 511, UE 501 receives an extended Protocol Configuration Options (ePCO)/PCO IE that carries a list of QoS flow descriptions from network 502. In one example, the ePCO/PCO IE may be contained in an activate default EPS bearer context request message or in an activate dedicated EPS bearer context request message during an EPS bearer activation procedure of a PDN connection—to create a new QoS flow description. In another example, the ePCO/PCO IE may be contained in a modify EPS bearer context request message during an EPS bearer modification procedure of a PDN connection—to modify the EPS bearer identity of an existing QoS flow description. In step 521, in response to the request message, UE 501 sends an activate default EPS bearer context accept message, an activate dedicated EPS bearer context accept message, or an modify EPS bearer context accept message to network 502. However, if the EPS bearer identity included in the QoS flow description does not correspond to any active EPS bearer context of the PDN connection, then in step 531, when inter-system change from EPS to 5GS happens, the handling of the QoS flow description associated with an invalid EPS bearer context is not defined.

Figure 6:
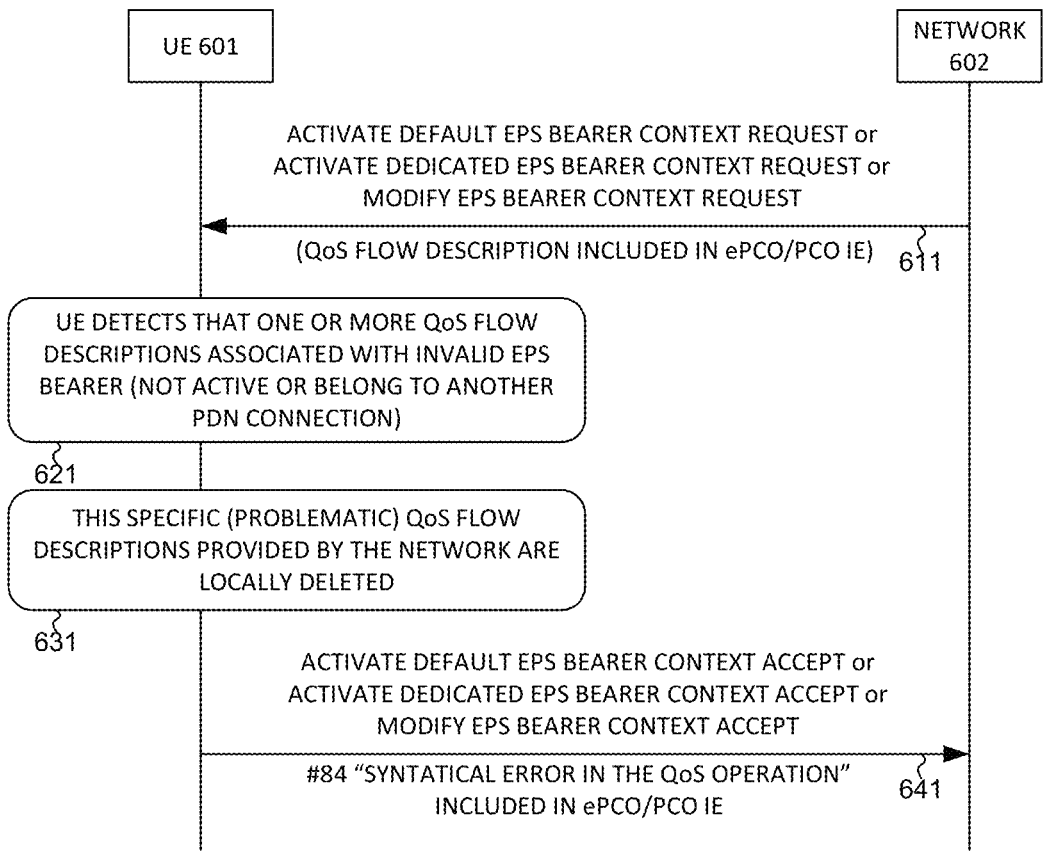
FIG. 6 illustrates a sequence flow between a UE and a network entity for handling EPS bearer activation and modification procedures when a QoS flow description IE is provided without valid EPS bearer association in accordance with one novel aspect.

FIG. 6 illustrates a sequence flow between a UE and a network entity for handling EPS bearer activation and modification procedures when a QoS flow description IE is provided without valid EPS bearer association in accordance with one novel aspect. In step 611, UE 601 receives an extended Protocol Configuration Options (ePCO)/PCO IE that carries a list of QoS flow descriptions from network 602. In one example, the ePCO/PCO IE may be contained in an activate default EPS bearer context request message or in an activate dedicated EPS bearer context request message during an EPS bearer activation procedure of a PDN connection—e.g., to create a new QoS flow description. In another example, the ePCO/PCO IE may be contained in a modify EPS bearer context request message during an EPS bearer modification procedure of a PDN connection—e.g., to modify the EPS bearer identity of an existing QoS flow description.

In accordance with one novel aspect, during an EPS bearer activation procedure of a PDN connection, when the UE is provided with one or more QoS flow descriptions or the EPS bearer identity of an existing QoS flow description is modified in ePCO/PCO IE of the ACTIVATE DEFAULT EPS BEARER CONTEXT REQUEST or ACTIVATE DEDICATED EPS BEARER CONTEXT REQUEST message, the UE shall check whether the EPS bearer identity included in the QoS flow description corresponds to an active EPS bearer context of the PDN connection associated with the EPS bearer context being activated (621). If the EPS bearer identity included in the QoS flow description does not correspond to any active EPS bearer context of the PDN connection associated with the EPS bearer context being activated, UE 601 should locally delete the QoS flow description and all the associated QoS rules (631), and include an ePCO/PCO IE with a 5GSM cause parameter set to 5GSM cause #84 "syntactical error in the QoS operation" in the ACTIVATE DEFAULT EPS BEARER CONTEXT ACCEPT or ACTIVATE DEDICATED EPS BEARER CONTEXT ACCEPT message (641).

Similarly, during an EPS bearer modification procedure of the PDN connection, when the UE is provided with one or more QoS flow descriptions or the EPS bearer identity of an existing QoS flow description is modified in the Protocol configuration options IE or Extended protocol configuration options IE in the MODIFY EPS BEARER CONTEXT REQUEST message, the UE shall check whether the EPS bearer identity included in the QoS flow description corresponds to an active EPS bearer context of the PDN connection associated with the EPS bearer context being modified (621). If the EPS bearer identity included in the QoS flow description does not correspond to any active EPS bearer context of the PDN connection associated with the EPS bearer context being modified, UE 601 should locally delete the QoS flow description and all the associated QoS rules (631), and should include an ePCO/PCO IE with a 5GSM cause parameter set to 5GSM cause #84 "syntactical error in the QoS operation" in the MODIFY EPS BEARER CONTEXT ACCEPT message (641).

Figure 7:
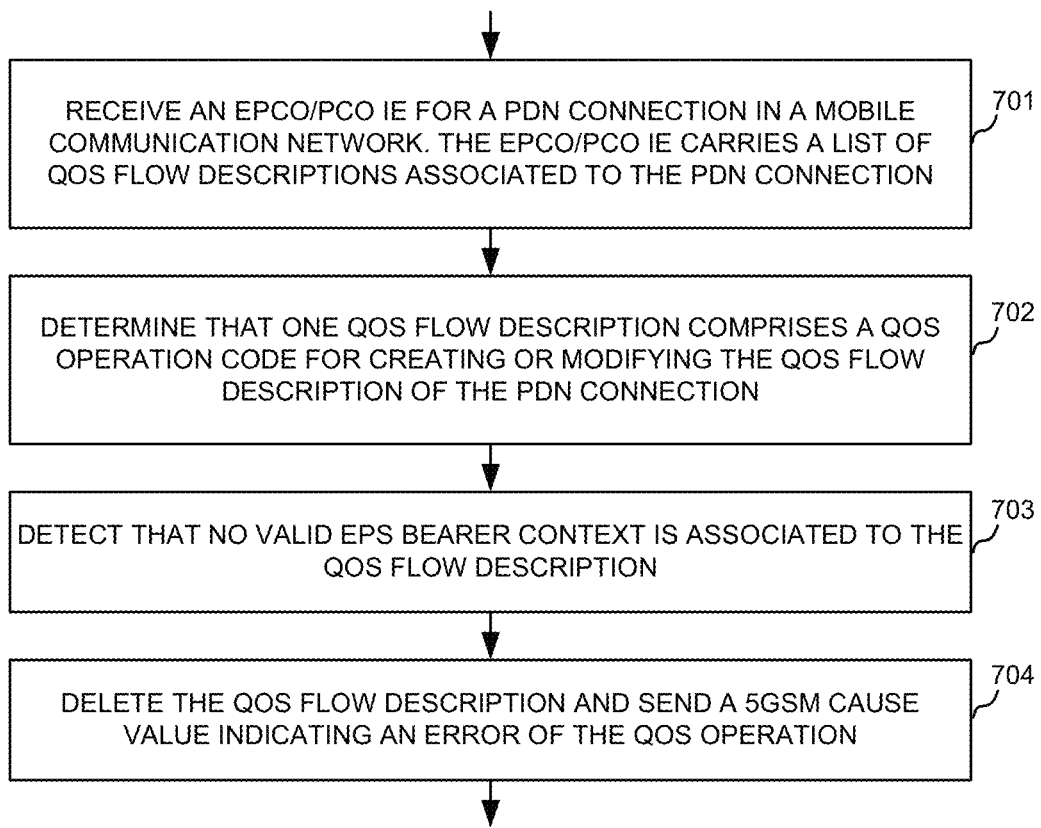
FIG. 7 is a flow chart of a method of handling QoS flow description creation without corresponding valid EPS bearer context in accordance with one novel aspect of the present invention.

FIG. 7 is a flow chart of a method of handling QoS flow description creation without corresponding valid EPS bearer context in accordance with one novel aspect of the present invention. In step 701, a UE receives an extended Protocol Configuration Options (ePCO)/PCO information element (IE) for a Packet Data network (PDN) connection in a mobile communication network. The ePCO/PCO IE carries a list of Quality of Service (QoS) flow descriptions associated to the PDN connection. In step 702, the UE determines that one QoS flow description comprises a QoS operation code for creating or modifying the QoS flow description of the PDN connection. In step 703, the UE detects that no valid Evolved Packet System (EPS) bearer context is associated to the QoS flow description. In step 704, the UE deletes the QoS flow description and sending a 5G session management (5GSM) a cause value indicating an error of the QoS operation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving an extended Protocol Configuration Options (ePCO)/PCO information element (IE) for a Packet Data network (PDN) connection by a user equipment (UE) in a mobile communication network, wherein the ePCO/PCO IE carries a list of Quality of Service (QoS) flow descriptions associated to the PDN connection;
determining that a QoS flow description comprises a QoS operation code for creating or modifying the QoS flow description of the PDN connection;
detecting that no valid Evolved Packet System (EPS) bearer context is associated to the QoS flow description; and
deleting the QoS flow description and sending a 5G session management (5GSM) cause value indicating an error of the QoS operation.

2. The method of claim 1, wherein the ePCO/PCO IE is carried by an activate default EPS bearer context request message or by an activate dedicated EPS bearer context request message.

3. The method of claim 2, wherein the cause value is carried by an activate default EPS bearer context accept message or by an activate dedicated EPS bearer context accept message in response to the activate default EPS bearer context accept message or to the activate dedicated EPS bearer context accept message.

4. The method of claim 1, wherein the ePCO/PCO IE is carried by a modify EPS bearer context request message.

5. The method of claim 4, wherein the cause value is carried by a modify EPS bearer context accept message in response to the modify EPS bearer context request message.

6. The method of claim 1, wherein each QoS flow has a QoS flow description containing a parameters list, and wherein the parameters list comprises an EPS bearer identity (EBI) field.

7. The method of claim 6, wherein the detecting involves detecting the EBI of the QoS flow description is not active in the PDN connection.

8. The method of claim 6, wherein the detecting involves detecting the EBI of the QoS flow description belongs to another PDN connection.

9. The method of claim 1, wherein the cause value is set to value #84 indicating a syntactic error of the QoS operation.

10. A User Equipment (UE), comprising:

a receiver that receives an extended Protocol Configuration Options (ePCO)/PCO information element (IE) for a Packet Data network (PDN) connection in a mobile communication network, wherein the ePCO/PCO IE carries a list of Quality of Service (QoS) flow descriptions associated to the PDN connection;

a QoS management circuit that determines that a QoS flow description comprises a QoS operation code for creating or modifying the QoS flow description of the PDN connection, and detects that no valid Evolved Packet System (EPS) bearer context is associated to the QoS flow description; and a transmitter that sends a 5G session management (5GSM) cause value indicating an error of the QoS operation upon deleting the QoS flow description.

11. The UE of claim 10, wherein the ePCO/PCO IE is carried by an activate default EPS bearer context request message or by an activate dedicated EPS bearer context request message.

12. The UE of claim 11, wherein the cause value is carried by an activate default EPS bearer context accept message or by an activate dedicated EPS bearer context accept message in response to the activate default EPS bearer context accept message or to the activate dedicated EPS bearer context accept message.

13. The UE of claim 10, wherein the ePCO/PCO IE is carried by a modify EPS bearer context request message.

14. The UE of claim 13, wherein the cause value is carried by a modify EPS bearer context accept message in response to the modify EPS bearer context request message.

15. The UE of claim 10, wherein each QoS flow has a QoS flow description containing a parameters list, and wherein the parameters list comprises an EPS bearer identity (EBI) field.

16. The UE of claim 15, wherein the detecting involves detecting the EBI of the QoS flow description is not active in the PDN connection.

17. The UE of claim 15, wherein the detecting involves detecting the EBI of the QoS flow description belongs to another PDN connection.

18. The UE of claim 10, wherein the cause value is set to value #84 indicating a syntactic error of the QoS operation.

* * * * *